(12) United States Patent
Bhaskar

(10) Patent No.: US 6,393,148 B1
(45) Date of Patent: May 21, 2002

(54) CONTRAST ENHANCEMENT OF AN IMAGE USING LUMINANCE AND RGB STATISTICAL METRICS

(75) Inventor: Ranjit Bhaskar, Portland, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/312,067

(22) Filed: May 13, 1999

(51) Int. Cl.[7] ................................................. G06K 9/00
(52) U.S. Cl. ....................................... 382/169; 382/166
(58) Field of Search ................................ 382/169, 166, 382/254, 277, 279

(56) References Cited

U.S. PATENT DOCUMENTS

| 5,557,688 A | * | 9/1996 | Nakamura | 382/164 |
| 5,748,802 A | * | 5/1998 | Winkelman | 382/271 |
| 5,751,846 A | * | 5/1998 | Higgins-Luthman | 382/169 |
| 5,838,455 A | * | 11/1998 | Imaizumi | 358/298 |

OTHER PUBLICATIONS

Handbook of Image and Video Processing p. 25, 26831 by Inoue, 1992.*
Vicent Caselles, et al., "Shaping Preserving Local Histogram Modification", IEEE Transactions on Image Processing, vol. 8, Feb. 1999. pp. 220–230.

* cited by examiner

Primary Examiner—Jerome Grant, II

(57) ABSTRACT

An automatic contrast enhancement method improves the quality of an image by increasing the dynamic range of the tone levels in an image without causing an undesirable hue shift. An overall stretch factor that stretches the dynamic range of all the colors is generated based on the standard deviation of the tone levels for the overall luminance of the image. A color weighting factor is used to individually control the amount that each color is stretched. The color weighting factor is based on the difference between the standard deviation of the tone levels for the overall luminance of the image and the standard deviation of the tone levels for each color. An anchor factor is used to preserve the mean tone level for each color while the tone levels far from the mean tone level are changed more dramatically than the tone levels close to the mean tone level, which minimizes hue shifts while maximizing contrast enhancement.

17 Claims, 6 Drawing Sheets

CONTRAST ENHANCEMENT OF AN IMAGE USING LUMINANCE AND RGB STATISTICAL METRICS

FIELD OF THE INVENTION

The present invention relates to improving the quality of an image being displayed by, for example, a printer or a monitor and, more particularly, to automatically improving the image quality without introducing undesirable hue shifts.

BACKGROUND

When reproducing a computer monitor's displayed image on a printer, the user typically wants the printed image to match the image on the monitor as closely as possible. A close match, however, is desirable only when the input image is ideal. With greater access to mediums such as digital cameras, desktop scanners, and the internet, users are gaining greater access to digital images that have varying degrees of quality. The disadvantage of having the printed image closely match the input image is that if the image is of poor quality, the printed image will retain the input image's negative characteristics, such as poor contrast and improper lighting. Consequently, the image may be printed with the true colors of the image compressed and/or details washed out.

After-market products exist for the user to manually adjust the contrast, brightness or color levels of the input image. In some cases, adjustments are made automatically to the contrast and tone levels of an image. While these after-market applications may improve poor images, they also introduce unwanted hue shifts.

Current printer drive technology requires that in order for a user to obtain feedback on the actual image print quality, the user must actually print out and look at the image. At present, automatic enhancements are limited to halftoning methods that distribute dots more evenly, filters to increase sharpness or to reduce graininess in the printed image, and color maps to reproduce hues more accurately. However, these methods of enhancement have negligible impact on images of poor quality.

A common method of improving the quality of an image is to use histogram contrast equalization. A histogram provides a global description of the appearance of an image by charting the number of pixels at each tone level. Contrast equalization involves increasing the dynamic range of an image by maximizing the spread between adjacent tone levels. While equalization extracts information in regions where tone levels are tightly compressed, equalization can also cause hue shifts and over saturation.

Consequently, there is a need for a method to automatically improve the quality of digital images without causing undesired hue shifts or degrading the characteristics of high quality images.

SUMMARY

An automatic contrast enhancement method and apparatus improves the quality of an image by increasing the dynamic range of the tone levels in an image without causing an undesirable hue shift. An overall stretch factor that is used to stretch the dynamic range of all the colors and is generated based on the standard deviation of the tone levels for the overall luminance of the image. A color weighting factor is used to individually control the amount that the tone levels in each color are altered. The color weighting factor is based on the difference between the standard deviation of the tone levels for the overall luminance of the image and the standard deviation of the tone levels for each color. An anchor factor is used to preserve the mean tone level for each color while the tone levels far from the mean tone level are changed more dramatically than the tone levels close to the mean tone level, which minimizes hue shifts while maximizing contrast enhancement.

The contrast enhancement method analyzes image characteristics, such as the mean tone level and standard deviation of the tone levels for the overall luminance of the image and the standard deviations of the tone levels for the different colors to determine the level of improvement that can be applied to the image. A minimal dynamic range stretch may be performed if the image is saturated at one of the extreme tone levels for a color or if there is a large variation in the standard deviations for the colors and the mean tone level for the luminance is near a mid tone level. Performing a full dynamic range stretch on an image with these characteristics may result in a noisy image or an even more saturated image, and only a minimal dynamic range stretch is performed. Further, if the standard deviation of the overall luminance is greater than a contrast threshold the image is considered to have an adequate contrast and, thus, no changes are made to the image.

DETAILED DESCRIPTION

Figure 1:
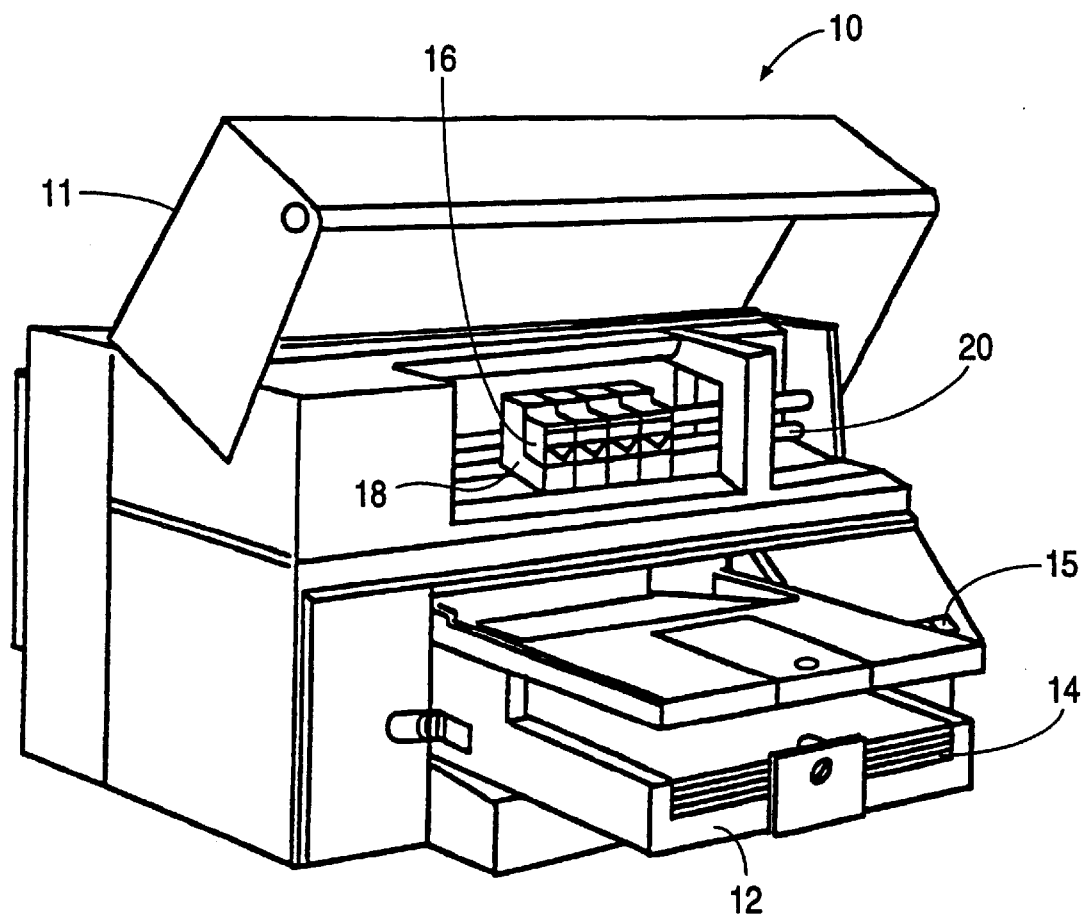
FIG. 1 illustrates a color inkjet printer which includes processing circuitry for performing all or part of the contrast enhancement method.

FIG. 1 illustrates one type of color ink jet printer 10 which includes processing circuitry for performing all or part of the contrast enhancement method described herein. The color inkjet printer includes a cover 11, a paper tray 12 for holding virgin paper 14, an output tray 15 for receiving the printed pages, color print cartridges 16, and a scanning carriage 18 for sliding along a slide bar 20 while dots are being printed on the paper. The color print cartridges 16 may include cyan (C), magenta (M), yellow (Y), and black (K) ink print cartridges.

Figure 2:
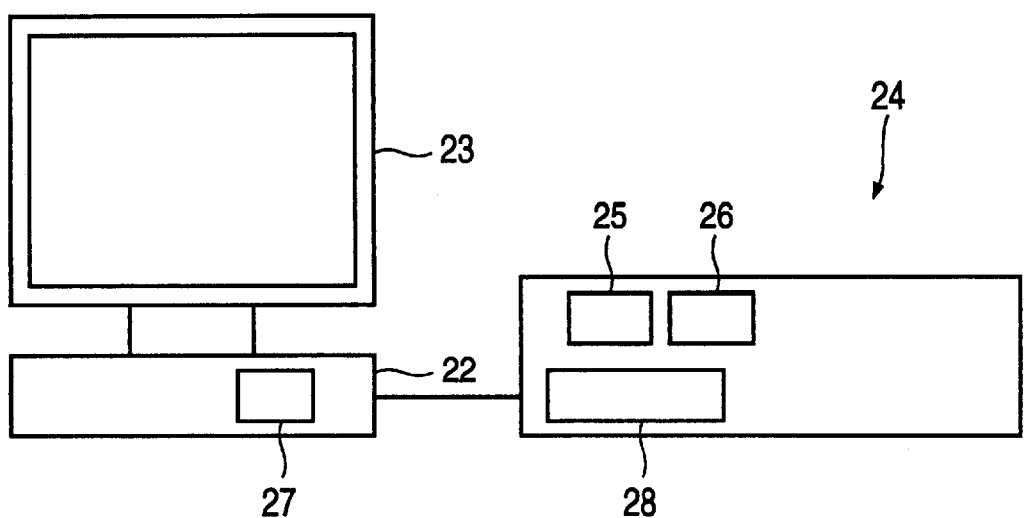
FIG. 2 illustrates a computer connected to an inkjet printer, where the computer or the printer or both carry out the present invention.

FIG. 2 is a schematic diagram of a printing system which includes a host computer 22, a monitor 23 (e.g., a CRT), and a printer 24. Printer 24 is a type of color inkjet printer which uses a tri-color (CMY) inkjet print cartridge 25 along with a black inkjet print cartridge 26 in a scanning carriage. Printer 10 in FIG. 1 may instead be connected to computer 22. Printer 24 includes a printer controller 28 for controlling the printing of dots by print cartridges 25 and 26. The print cartridges may print at 300 dots-per-inch (DPI), 600 DPI, or any other resolution. Computer 22 is shown as including a contrast enhancement filter 27 for automatically enhancing the contrast of the image in accordance with the present invention. It should be understood, however, that if desired contrast enhancement filter 27 may be located in printer 24 or in both computer 22 and printer 24.

Figure 3:
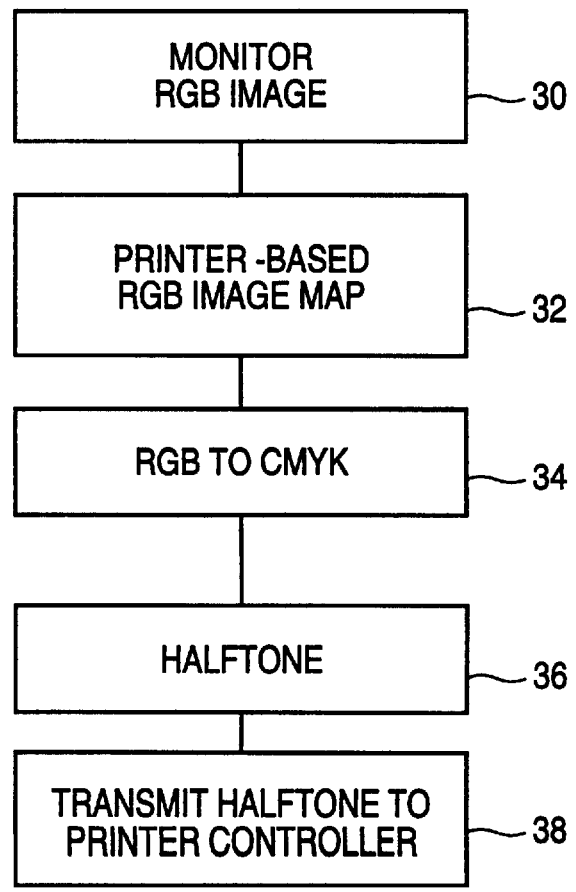
FIG. 3 illustrates the general method performed by the computer and printer of FIG. 2.

FIG. 3 illustrates the standard flow of image information from computer 22 to printer 24. An image is first created or introduced into the memory of computer 22. In order to be displayed on the computer monitor 23, this image is represented in additive RGB color space. Each pixel location on the screen can be illuminated in red, green, and blue at any one of 256 tone levels of intensity (0 to 255). It takes 8 bits to represent 256 levels ($2^8$=256). Each of the three primary colors require 8 bits; therefore, RGB color monitors are commonly referred to as producing 24-bit color (3×8=24). This image is represented at the spatial resolution of the particular monitor. Typical monitors have 75 pixels per linear inch (75 DPI) in the vertical and horizontal directions.

It should be understood that the present invention is described using 256 tone levels of intensity (0–255), which is the potential dynamic range of the RGB colors. However, if desired a smaller or larger potential dynamic range of tone levels may be used in accordance with the present invention.

At step 30, the 24-bit RGB color image is held in the memory of computer 22 so that it can be displayed on monitor 23.

At step 32, the image in memory is converted to a 24-bit RGB image at the resolution of the printer. Typical inkjet printers have a resolution of 300, 600 or 1200 dots per inch. Although the printer typically print in CMY or CMYK subtractive colors, it is nevertheless convenient for image processing purposes at step 32 to consider the printer to be an RGB device. This is because later translating the color monitor RGB values directly to CMYK will usually produce a calorimetric match. However, not all of the matching values will produce the same image quality. Some choices will contain more visual noise than others, while other choices may lead to undesirable discontinuities in the halftone transitions of an image. The contrast enhancement method in accordance with the present invention uses RGB color space, and thus occurs in step 32. The contrast enhancement method will be described in more detail later.

Alternatively, the contrast enhancement method may use CMYK color space, in which case the process occurs at a later step, e.g., step 34.

At step 34, the printer RGB color image is converted into CMYK color space using a lookup table or other conventional means of conversion.

In step 36, the CMYK image is conventionally halftoned to convert the image from 4-plane (CMYK), 8-bits per color to 4-plane binary color (on or off dots) at the DPI resolution of the printer. In other words, the color and intensity (0–255) at each pixel location is converted into a pattern of on or off C, M, Y, or K dots (0 or 255 intensity) to be printed. This halftoned image (which may be a portion of the total image) is stored in a memory. Halftoning is well understood by those of ordinary skill in the art. One exemplary method of halftoning that may be used is described in detail in Digital Halftoning, by Robert Ulichney, The MIT Press, 1987, incorporated herein by reference.

At step 38, the halftone image is transmitted to the printer, typically using efficient communication techniques such as using escape Sequences like those identified in Hewlett-Packard Company's Printer Control Language (PCL). The image produced at step 36 includes all of the information about how many dots of each color are to be printed at each pixel location on the page and the locations of the dots. The printer controller 28 (FIG. 2) decides when these dots should be printed (i.e., in a single pass or in multiple passes). Because of the nature of inkjet printing, it is often beneficial to lay down dots in more than a single pass and to print individual passes in some kind of checkerboard or other sparse pattern. It is also beneficial to overlap passes with these interstitial patterns to hide artifacts that may occur between swaths. These procedures for determining in what pass and in what pattern the dots will be laid down are referred to as "print modes."

The contrast enhancement method in accordance with the present invention is now described in detail with reference to the remaining figures.

It will be understood that, depending on the printer, the functions discussed in relation to FIG. 3 can be performed by the host computer (programmed to carry out the processing functions) or by the printer. For example, in a "smart" printer, steps 32 through 38 could all be performed in the printer. On the other hand, to save memory costs in the printer, all or part of the functions 32 through 38 could be performed in the host computer.

Figure 4A:
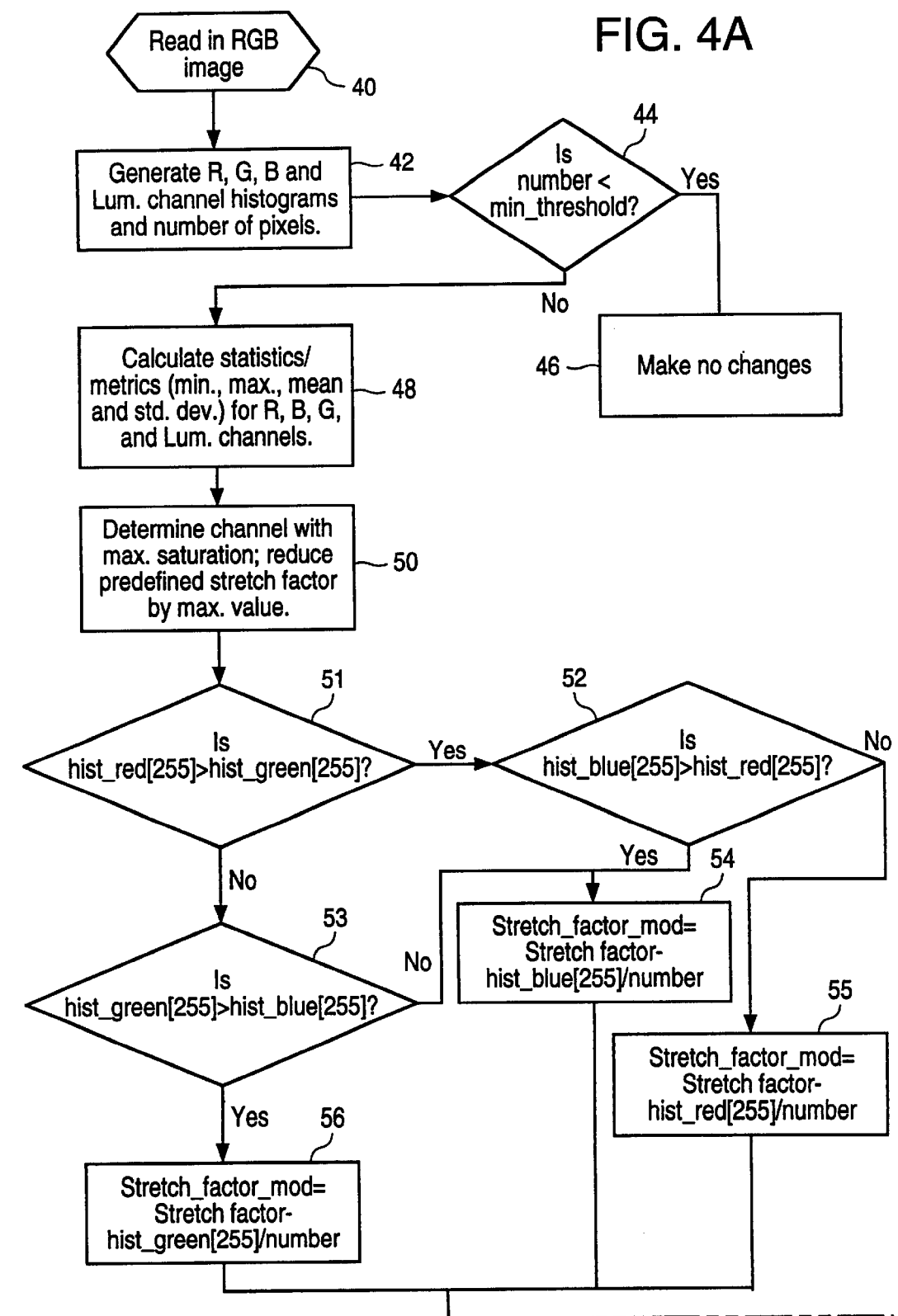
FIG. 4 is a flow chart which describes in more detail the contrast enhancement method performed by the computer or the printer or a combination of both.
Figure 4B:
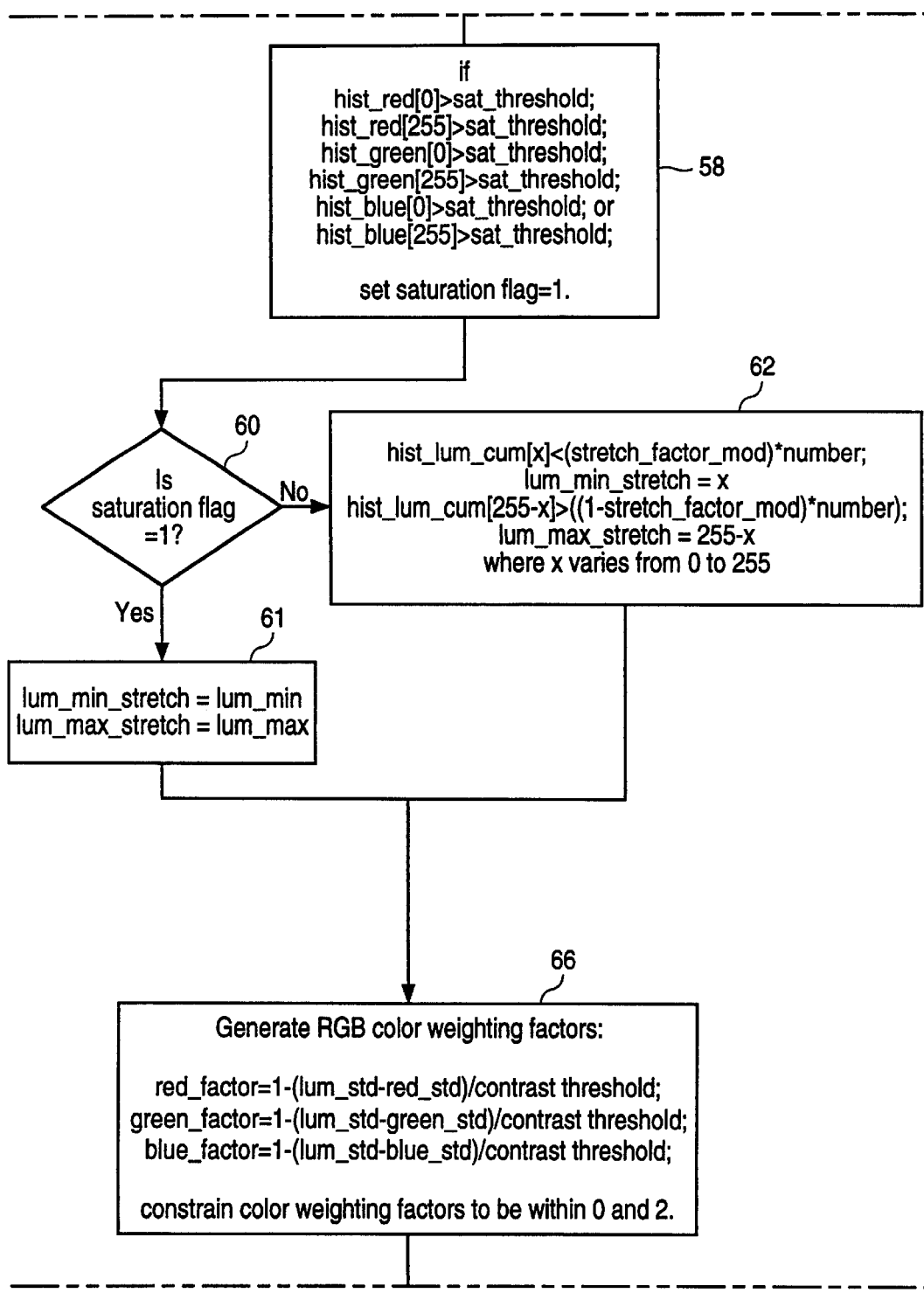
Figures 4, 4C:
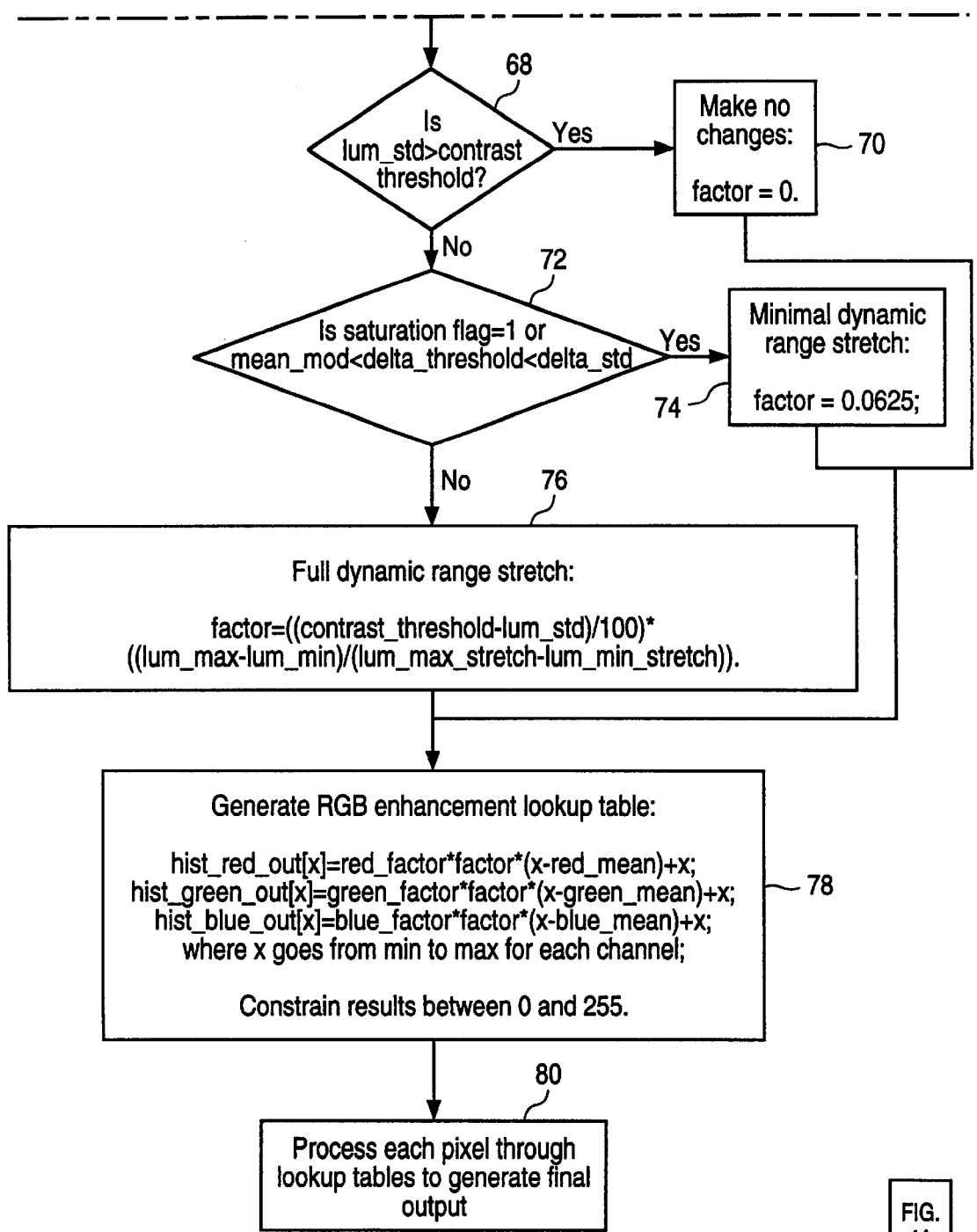

FIG. 4 is a flowchart illustrating the basic steps of the preferred contrast enhancement process performed by the contrast enhancement filter 27 (FIG. 2). The contrast enhancement process uses histogram information from the input image and calculates image metrics, such as the mean and standard deviations for the tone levels of the different colors and the overall luminance of the image. The different colors, e.g., RGB colors, and the overall luminance of the image will be referred to herein as channels.

Based on the metrics, stretch factors are generated and used to form an RGB enhancement lookup table for converting each original RGB input pixel into an enhanced RGB output pixel. The contrast enhancement method stretches the original dynamic range of the tone levels in each RGB channel to an enhanced dynamic range which improves the contrast as well as the brightness of the image.

The contrast enhancement method uses: 1) the standard deviation for each channel to determine a color weighting factor for each respective color; 2) the standard deviation for the luminance channel to determine an overall stretch factor; and 3) the mean for each color to serve as an anchor from which the stretching is based. Because the mean is used as an anchor, the mean tone level for each color will remain approximately the same, and ideally will remain exactly the same, after the enhancement process. The tone levels for each color are stretched further at the extreme tone levels than at tone levels near the mean tone level. The use of the mean tone level as an anchor advantageously maximizes contrast enhancement while minimizing undesirable hue shift.

Figure 5:
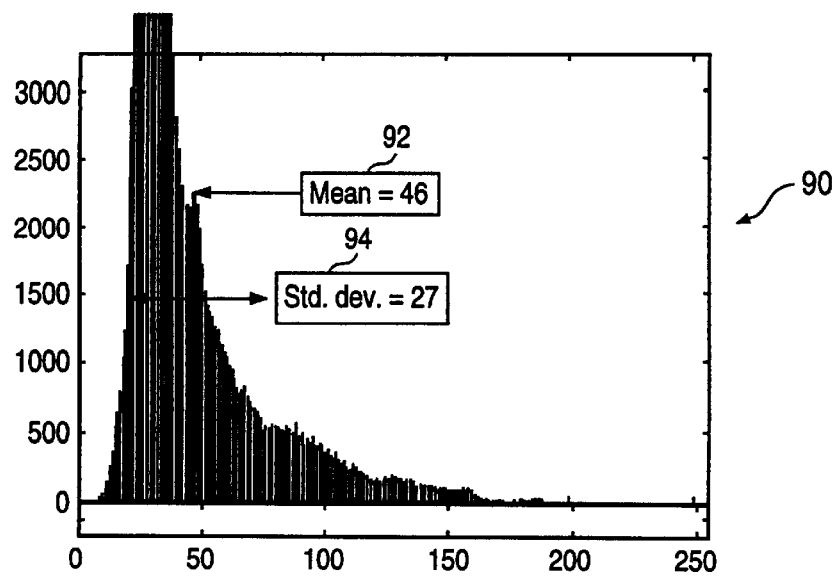
FIG. 5 is a histogram of an image representing the tone levels for an RGB channel.

In step 40 of FIG. 4 the input image is read into the contrast enhancement filter 27 (FIG. 2) as RGB values. Histograms are generated for the RGB and overall luminance channels in step 42, along with the total number of pixels in the image. The histograms are global descriptions of the appearance of the image. The histograms chart the number of pixels at each tone level, e.g., 0–255, for each RGB channel. FIG. 5 is an example of a histogram for an image.

The luminance value is generated for each pixel as:

$$\text{luminance value} = 0.299 \times \text{red} + 0.587 \times \text{green} + 0.114 \times \text{blue} \qquad \text{equ. 1}$$

Of course, if desired, other methods of generation the luminance value may be used, including the use of different values for the multiplicands in equation 1. Each pixel will have a luminance value that may vary over the same range as the tone levels of the RGB colors, e.g., 0–255, and, thus, the luminance values will be referred to herein as tone levels for the sake of convenience. Accordingly, the histogram for the overall luminance of the image charts the number of pixels at each luminance tone level, e.g., 0–255.

In step 44, it is determined if the total number of pixels in the image is less than a minimum threshold number (min_threshold), e.g., 64. If the total number of pixels is less than the minimum threshold the image is considered too small for the contrast enhancement method and no changes are made, as shown in step 46. Otherwise, the process flows to step 48.

In step 48, metrics are generated for the image using the histograms for the RGB and luminance channels. Image metrics include the minima, maxima, mean, and standard deviation for each channel. These values serve as the foundation used to determine whether the incoming image is too dark, too light, or lacking contrast. It should be understood that the different types of metrics, i.e., minima, maxima, mean, and standard deviations, need not be generated all at once, but may be generated at anytime in the process. Thus, if desired, each different type of metric is generated only when it becomes necessary, thereby maximizing computer processor efficiency.

The mean tone levels (lum_mean, red_mean, green_mean, blue_mean) are determined for each channel with respect to the total image. The standard deviation of the tone levels for the channels (lum_std, red_std, green_std, and blue_std) is determined about the mean for each channel in a conventional manner.

In steps 50–56, a maximum saturation value at the highest tone level (255) is determined for the image and is used to reduce a predefined modifier factor. The predefined modifier factor is an empirically derived value used to determine how many extreme pixels can be considered noise. The predefined modifier factor acts as a base percentage by which the dynamic range of the tone levels will be modified. While any predefined modifier factor may be used, e.g., 0.05 to 0.001, a predefined modifier factor equal to 0.005 has empirically been found to be adequate.

Steps 51–53 are used to determine the maximum saturation value by comparing each RGB channel histogram at the highest tone level (hist_color[255]) to find the histogram with the largest value. The highest tone level (255) is used, as opposed to the lowest tone level (0) because it has been found empirically that a large number of low tone values (implying undersaturation) does not adversely affect the output of the contrast enhancement process, and thus, the predefined modifier factor need not account for such values.

The predefined modifier factor is then modified based on the maximum saturation value as shown in steps 54–56. The maximum saturation value is subtracted from the predefined modifier factor which is then divided by the number of pixels in the image to generate a modified stretch factor (stretch_factor_mod).

In step 58 it is determined if the image is saturated at either the high or low tone levels, e.g., 255 and 0, respectively, in any of the RGB channels. To determine if the image is saturated, the high and low tone levels are compared to a saturation threshold for each RGB channel. The saturation threshold is a function of the number of pixels in the image as shown in equation 2, below:

$$\text{Sat\_Threshold} = \left(\frac{\text{predefined\_stretch\_factor}}{4}\right) \times \text{number\_of\_pixels} \quad \text{equ. 2}$$

Thus, the saturation threshold is equal to a saturation factor, shown in equation 1 as the predefined modifier factor divided by four (0.005/4=0.00125), which is then multiplied by the number of pixels in the image. The saturation threshold was determined empirically and, thus, other saturation thresholds may be used, or if desired other derivations of the saturation threshold may be used including the use of other saturation factors.

If any of the RGB channels at either the lowest or highest tone levels is greater than the saturation threshold, the image is considered saturated. Because a saturated image has a large number of pixels at one extreme of the tone level range for an RGB channel, information in the saturated channel is lost. As shown in step 58, if the image is determined to be saturated, a saturation flag is set equal to 1.

If the image is considered saturated, a minimum and maximum luminance stretch factor (lum_min_stretch and lum_max_stretch) are defined as the minimum and maximum values of the luminance channel, as shown in steps 60 and 61.

If, however, the image is not considered saturated, the values of the minimum and maximum luminance stretch factors (lum_min_stretch and lum_max_stretch) are determined as shown in step 62. To generate the minimum luminance stretch value (lum_min_stretch), the modified stretch factor, determined in steps 54–56, is multiplied by the number of pixels in the image to produce a luminance stretch threshold value. The values of the luminance histogram at each tone level are then cumulated from lowest to highest, i.e., from 0 to 255, and compared to the luminance stretch threshold value at each new cumulated tone level. When the cumulated luminance histogram (hist_lum_cum[x]) is equal to or greater than the luminance stretch threshold value the minimum luminance stretch factor (lum_min_stretch) is set at that tone level.

Similarly, the maximum luminance stretch value (lum_max_stretch) is generated by deriving another luminance stretch threshold value that is equal to 1 minus the modified stretch factor which is then multiplied by the number of pixels. The values of the luminance histogram at the tone levels are then cumulated from highest to lowest, i.e., from 255 to 0, until the cumulated luminance histogram (hist_lum_cum[255-x]) is equal to the luminance stretch threshold value. The maximum luminance stretch factor (lum_max_stretch) is set at that tone level.

The minimum and maximum luminance stretch factors (lum_min_stretch and lum_max_stretch) are used to generate the overall stretch factor that is used to stretch the RGB channels. The luminance channel will only be stretched as a result of the stretched RGB channels and by directly changing the luminance values.

The amount of contrast enhancement to be performed on the image is determined next. As shown in step 66, the color weighting factors for the RGB channels (red_factor, green_factor, and blue_factor) are individually generated. The color weighting factors are used to adjust the amount of stretching of the dynamic range for each color based on each RGB channel's individual standard deviation. An RGB channel that has a large standard deviation, indicating a large amount of contrast in that channel, requires less stretching than is required for an RGB channel with a small standard deviation, indicating little contrast in that channel. Each color weighting factor is produced as shown below:

$$\text{color\_factor} = 1 - \frac{\text{lum\_std} - \text{color\_std}}{\text{contrast\_threshold}} \qquad \text{equ. 3}$$

where the contrast threshold is an empirically determined value, which is chosen as an indication that a channel has adequate contrast. The contrast threshold, for example, may have a value of approximately one fourth the total dynamic range, and in one embodiment is equal to 70. The actual range for the color weighting factors is between approximately −1.8 and 2.8, but is constrained to be between 0 and 2. Thus, if a color weighting factor is less than 0 or greater than 2, that color weighting factor is defined as 0 or 2, respectively.

In step 68, it is determined whether the standard deviation for the overall luminance of the image is greater than the contrast threshold. If the standard deviation in the luminance channel is greater than the contrast threshold, there is an adequate amount of contrast in the image and no modification is necessary. Thus, the overall stretch factor is defined as 0, as indicated in step 70. However, if the luminance standard deviation is less than the contrast threshold, at least some modification is deemed necessary and the process flows to step 72.

In step 72, a decision is made whether to perform a full dynamic range stretch or a minimal dynamic range stretch. As shown in step 72, a minimal dynamic range stretch is performed if the image is considered saturated (step 58) or if there is a large variation in the standard deviations for the RGB channels and the luminance mean is near a mid tone level, e.g., 128. The modified mean value (mean_mod), shown in step 72, is equal to the absolute value of the mid tone level minus the luminance mean (128-lum_mean). The delta_threshold term in step 72 is equal to the contrast threshold divided by two (70/2=35), but may be any value desired. The difference in the standard deviations of the RGB channels (delta_std) is as follows:

delta_std=(red_std−green_std)|+|(green_std−blue_std)|+|(red_std−blue_std)| equ.4

As shown in step 72, the determination of whether the variation between the standard deviations of the RGB channels is "large" is made by comparison to an empirically determined threshold, i.e., the contrast threshold divided by 2. Further, the determination of whether the luminance mean is "near" a mid tone level is made by comparison to the same empirically determined threshold. It should be understood that if desired two different thresholds may be used for these determinations.

If the image is saturated or if there is a large variation between standard deviation of the RGB channels and the luminance mean is near a mid tone level, a minimal dynamic range stretch is to be performed and the overall stretch factor is set equal to an empirically determined number such as 0.0625 in step 74. Otherwise, the process flows to step 76.

Step 72 is used to ensure that certain types of images are not drastically altered. For example, no additional information can be extracted by redistribution of tone levels that are saturated. Consequently, using a full overall stretch factor is unnecessary in an image that is saturated. However, because other colors may not be saturated, it has been determined empirically that a minimal dynamic range stretch of the RGB channels may be beneficial.

In addition, the stretch factor is minimized where the image has a limited tonal range or special lighting conditions, for example, an image of a sunset. Using a full overall stretch factor with, for example, an image of a sunset that uses a wide dynamic range in the red channel and a minimum range in the blue and green channels, would stretch out the compressed blue and green channels and generate a noisy image. Thus, to avoid degrading the characteristics of a high quality image, the full overall stretch factor is not used. It has been determined empirically, however, that a minimal dynamic range stretch may be beneficial.

Of course, values other than 0.0625 may be used for the minimal overall stretch factor or if desired, the minimal overall stretch factor may be some percentage of the full overall stretch factor, which is determined in step 76.

In step 72 it is determined that a full dynamic range stretch is desired, an overall stretch factor is generated as shown in step 76. The overall stretch factor is determined according to the following:

$$\text{factor} = \left(\frac{\text{contrast\_threshold} - \text{lum\_std}}{100}\right) \qquad \text{equ. 5}$$

$$\left(\frac{\text{lum\_max} - \text{lum\_min}}{\text{lum\_max\_stretch} - \text{lum\_min\_stretch}}\right)$$

Thus, the overall stretch factor is generated based on a contrast factor which is equivalent to the difference between the contrast threshold and the luminance standard deviation which is then divided by 100. The overall stretch factor is also determined based on a luminance range factor which is equivalent to the difference between the maximum and minimum luminance tone levels divided by the difference between the maximum and minimum luminance stretch factors determined in steps 60–62.

An RGB enhancement lookup table is generated in step 78 to convert the original tone levels for each RGB channel into an enhanced tone level using the color weighting factors, the overall stretch factor, and an anchor factor. The anchor factor, which is the (x−color_mean) term in step 78 where x represents the tone level and color_mean represents any of the RGB channel means, ensures that the dynamic stretching occurs around the mean value. When the tone level (x) is equal to the mean value of the RGB channel, the anchor factor is equal to 0 and no stretching will occur. However, the greater the difference between the tone level (x) and the mean value of the RGB channel, the larger the anchor factor will be and, thus, a greater amount of stretching will occur. Thus, the tone levels at the extremes are stretched further than those levels near the mean thereby advantageously providing enhanced contrast. By anchoring the stretching around the mean, hue shifts in the image are advantageously limited.

The enhanced tone levels in the RGB enhancement lookup table are generated by multiplying together the overall stretch factor, the color weighting factor, and the anchor factor and then adding the original tone level for each RGB channel. The results in the enhancement lookup table are constrained to be within the original potential dynamic range, e.g., tone levels 0–255.

In step 80, each pixel is processed through the lookup table to generate the final RGB output image. Thus, the original tone levels of each RGB channel in each pixel are processed through the lookup table resulting in the enhanced tone levels. The final RGB output image may then be converted to CMYK values as shown in step 34 in FIG. 3.

By using the above process, the image is automatically analyzed to determine whether improvement of the image is called for, and if so, to what degree the image should be enhanced. Further, the above process avoids undesirable hue shifts by anchoring enhancements about the mean for each RGB channel.

The source code in Visual C++ for the above process is attached hereto as appendix A. As can be seen in the source code, the order of the particular steps in the process and/or portions of each step may be performed in a different order or at a different time than is shown in the flow chart of FIG. 4, for the sake of computer processing efficiency, for example.

FIG. 5 shows a histogram 90 representing one RGB channel in an image, where the x axis represents the tone level of the RGB channel, i.e., 0–255, and the y axis represents the number of pixels in the image at each tone level from 0 to 3000. Tone levels that are present in more than 3000 pixels in the image are shown as off the chart. Nevertheless, it should be understood that in the contrast enhancement process the true values of the tone levels are used. Histogram 90 was generated using the MATLAB Image processing Toolbox may be The Math Works, Inc., located in Massachusetts. As can be seen in FIG. 5, the mean 92 of the histogram has a value of 46, and the standard deviation 94 has a value of 27. Because histogram 90 has a mean 92 with a value of 46 and a standard deviation 94 with a value of 27, the RGB channel will appear dark and have little contrast. It should be understood that while histogram 90 represents one RGB channel in the image, similar histograms are independently generated for the other RGB channels as well as the luminance channel.

Figure 6:
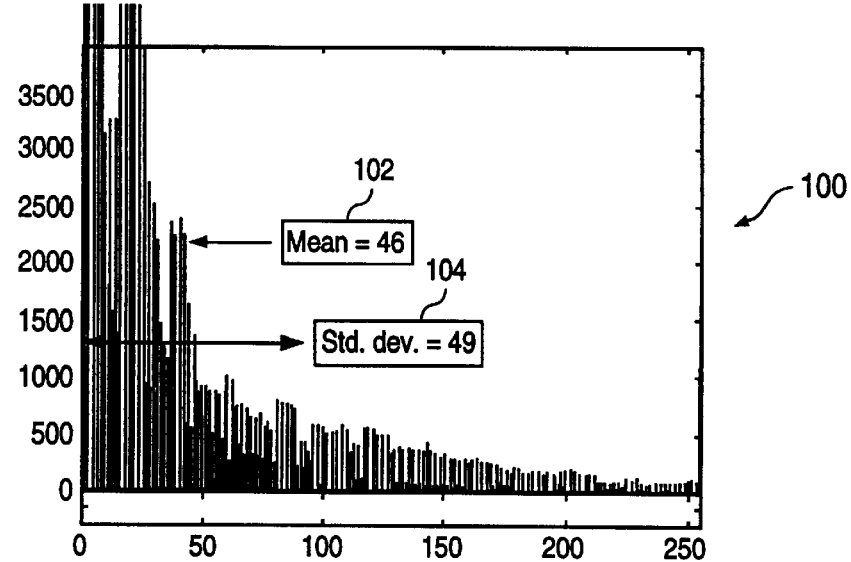
FIG. 6 is a histogram of the RGB channel for the same image used for FIG. 5 after the image is processed according to the present invention.

FIG. 6 shows a histogram 100 for the same RGB channel in the image used in FIG. 5, after enhancement in accordance with the present invention. As can be seen in FIG. 6, the mean 102 of histogram 100 has a value of 46, which is the same value as mean 92 (FIG. 5). Thus, because of the anchor factor in step 78, the mean value did not change. The standard deviation 104 has a value of 49, which is greater than standard deviation 94 (FIG. 5), has a value of 27. Consequently, the tone levels of the pixels in the image have a greater dynamic range, which increases the contrast of the RGB channel. Thus, information is extracted from areas where the tone levels were tightly compressed in FIG. 5. However, because the mean is anchored, there is little or no hue shift.

Figure 7:
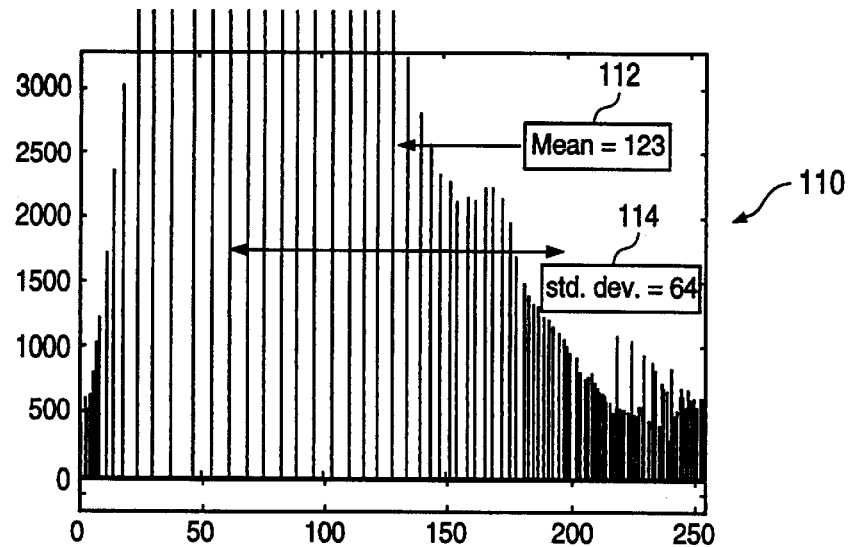
FIG. 7 is a histogram of the RGB channel for the same image used for FIG. 5 after the image is processed according to a conventional histogram equalization process.

FIG. 7 shows a histogram 110 for the same image after being processed using a conventional histogram equalization method. Equalization arbitrarily increases the dynamic range of an image by maximizing the spread between adjacent tone levels. As shown, in FIG. 7, the mean 112 of histogram has a value of 123, while the standard deviation 114 is equal to 64. While the redistribution of the tone levels in histogram 110 extracts information from the areas where the tone levels were tightly compressed, the mean tone level has shifted causing a hue shift in the RGB channel. Further, because the tone levels are more compressed at the high and low tone levels, the RGB channel may appear oversaturated.

It should be understood that while an embodiment of the present invention is described in reference to red, blue and green channels, alternative colors may be used. For example, the automatic contrast enhancement processing may use cyan, magenta, yellow, and black and may occur after step 34, shown in FIG. 3.

Moreover, while the present invention is described in reference to improving the printed image over the inputted image, it should be understood that the enhanced image may be displayed on the computer display monitor 23, shown in FIG. 2. Thus, the contrast enhancement method may be used to improve both the printed image as well as the displayed image. Moreover, while the printer shown in FIG. 1 is an inkjet printer, it should be understood that the present invention may be used in conjunction with other types of printers.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method of enhancing an image, said image comprising a plurality of colors, each color having a range of tone levels, said method comprising:

stretching the range of at least one color in said image, wherein the mean tone level for said at least one color remains approximately the same and the range of tone levels is stretched more at tone levels further away from said mean tone level than at tone levels close to said mean tone level, wherein said stretching the range comprises:

generating one overall stretch factor for all of said plurality of colors;

generating a color weighting factor for each respective color;

generating an anchor factor based on the mean tone level for each respective color, wherein said anchor factor holds the mean tone level at approximately the same tone level; and using said overall stretch factor, said color weighting factor, and said anchor factor to stretch the range for at least one color.

2. The method of claim 1, further comprising:

generating a lookup table to provide an enhanced tone level for each original tone level for at least one color in said image, each enhanced tone level being generated by multiplying said overall stretch factor and said color weighting factor and said anchor factor and adding said original tone level.

3. The method of claim 1, wherein generating an anchor factor comprises:

determining a mean tone level for each respective color;

subtracting said mean tone level for a color from each tone level in said individual color to obtain said anchor factor for each tone level.

4. The method of claim 1, wherein each color weighting factor is based on the difference between the standard deviation of the luminance of the image and the standard deviation of the tone levels of a color.

5. The method of claim 4, further comprising:

determining a contrast threshold value;

dividing the difference between the standard deviation of the luminance of the image and the standard deviation of the tone levels of a color by said contrast threshold value and subtracting the result from one.

6. The method of claim 1, wherein generating one overall stretch factor comprises:

determining a contrast threshold value;

obtaining a contrast factor based on the standard deviation of the luminance of the image and said contrast threshold value;

subtracting the minimum luminance level and the maximum luminance level and dividing by the difference between a maximum luminance stretch value and a minimum luminance stretch value to obtain a luminance range factor; and multiplying said contrast factor with said luminance range factor to obtain said overall stretch factor.

7. The method of claim 6, wherein said minimum luminance stretch value is determined according to the following:

determining a luminance stretch threshold value;

cumulating a luminance histogram from lowest to highest tone levels and comparing the results to said luminance stretch threshold; and setting the minimum luminance stretch factor at the tone level when said results are equal to or greater than said luminance stretch threshold.

8. The method of claim 6, wherein said maximum luminance stretch value is determined according to the following:

determining a luminance stretch threshold value;

cumulating a luminance histogram from highest to lowest tone levels and comparing the results to said luminance stretch threshold; and setting the maximum luminance stretch factor at the tone level when said results are equal to or greater than said luminance stretch threshold.

9. The method of claim 1, wherein generating one overall stretch factor for all of said plurality of colors comprises:

determining a contrast threshold value; and comparing the standard deviation of the luminance of the image with said contrast threshold value, said overall stretch factor being equal to zero if said standard deviation of the luminance of the image is greater than said contrast threshold value.

10. The method of claim 1, wherein generating one overall stretch factor for all of said plurality of colors comprises:

determining if said image is saturated; and equating said overall stretch factor to a minimal value if said image is saturated.

11. The method of claim 1, wherein generating one overall stretch factor for all of said plurality of colors comprises;

determining if there is a large variation between the standard deviation in the tone levels for the different colors;

determining if the mean value of the luminance of the image is near a mid tone level; and equating said overall stretch factor to a minimal value if there is a large variation between the standard deviation in the tone levels for the different colors and the mean value of the luminance of the image is near a mid tone level.

12. A method of enhancing a digital image, said image comprising a plurality of colors, each color having a range of tone levels, said method comprising:

producing histogram information for each color in said image and for the luminance of said image;

stretching the range of each color in said image by a weighting factor based in part on the difference between the standard deviation of the tone levels for the luminance minus the standard deviation of the tone levels for each respective color;

stretching the range of each color in said image by an overall stretch factor determined in part by the standard deviation of the tone levels of the luminance; and holding the mean tone level for each color at approximately the same tone level, wherein tone levels near said mean tone levels are stretched less than tone levels relatively far from said mean tone level.

13. The method of claim 12, further comprising:

determining a contrast threshold that has a value approximately equal to one fourth the range of the tone levels;

comparing the standard deviation of the tone levels of the luminance to said contrast threshold; and making no alterations to the range of the colors if said standard deviation of the tone levels of the luminance is greater than said contrast threshold.

14. The method of claim 13, further comprising:

determining if the mean tone level of the luminance is near a middle tone level;

determining if there is a large variation between the standard deviations in the tone levels for each color; and minimizing the stretch of the range for each color if both the mean tone level of the luminance is near a middle tone level and the difference in the standard deviations in the tone levels for each color is large.

15. The method of claim 14, wherein:

determining if said mean tone level of said luminance is near said middle tone level comprises:

determining a threshold;

comparing said threshold to the absolute value of the difference between said mean tone level of the luminance and said middle tone level;

determining if there is a large variation between the standard deviations in the tone levels for each color comprises:

finding the differences between the standard deviations of the tone levels for the different colors;

summing the absolute values of the differences; and comparing the sum of the absolute values of the differences to said threshold.

16. A printing system including a printer and a computer, said printing system performing a contrast enhancement method which enhances the printed image by stretching the range of the tone levels for each color in said printed image while maintaining the same mean tone level for each color to prevent hue shift, said method performed by said system comprising:

stretching the range of each color in said image by a weighting factor based in part on the difference between the standard deviation of the tone levels for the luminance of the image minus the standard deviation of the tone levels for each respective color;

stretching the range of each color in said image by an overall stretch factor determined in part by the standard deviation of the tone levels of the luminance of the image.

17. The printing system of claim 16, wherein said printing system automatically performs said contrast enhancement method.

* * * * *